3,159,531
FUNGICIDAL AGENTS

Hans Bruckner, Burgkirchen, Upper Bavaria, and Maximilian Czech and Kurt Hartel, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Aug. 22, 1961, Ser. No. 133,059
Claims priority, application Germany, June 22, 1961,
F 34,238
7 Claims. (Cl. 167—22)

It is known that organo-tin compounds of the general formula

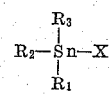

in which $R_1$, $R_2$ and $R_3$ each represent an organic radical bound to the tin atom via a carbon atom, and X represents an inorganic or organic radical not bound to the tin atom via a carbon atom, are suitable for combating microorganisms such as fungi, protozoa, bacteria, etc. (cf. German Patent 950,970). It is likewise known that certain compounds of the above formula (cf. British Patent 979,073) are suitable for combating phytopathogenic fungi in preserving the useful plants. Among these compounds, the triphenyl-tin derivatives proved particularly advantageous.

However, some varieties of plants exhibit a specific sensitivity towards organo-tin compounds though in general, the organo-tin compounds are phytotoxic to a low degree only. Consequently it is necessary to examine every preparation with a great number of plant varieties as to its tolerableness. Any appearing sensitivity limits the application of these compounds in practice.

Now, we have found that the scope of action of the above-mentioned fungicidal triphenyltin compounds, in particular of the triphenyltin acetate, triphenyltin hydroxide and triphenyltin chloride is considerably expanded when these compounds are used together with a zinc salt, a manganese salt or an iron salt of the ethylene-bis-dithiocarbamic acid which is known to be itself fungicidally active.

This unexpected finding is demonstrated by the hereinafter described greenhouse and field tests, some of which were sprinkling and permanent tests. The tests showed this combination to have a remarkable synergistic fungicidal action and a considerably reduced phytotoxicity. In some cases, the combination even increased the harvest yields. In these tests the ratio of blend used was 1 part by weight of triphenyltin compound to 8–14 parts by weight of manganese- or zinc-ethylene-bis-dithiocarbamate. Sensitive cultures are treated preferably with a mixture of 2–12 parts of a triphenyltin compound to 1 part of the manganese salt of ethylene-bis-dithiocarbamic acid. All data of these comparative tests of the combinations were, of course, referred to the same quantity of active substance per hectare.

The above described properties of the combination of the present invention permit to apply organo-tin compounds to culture plants such as vines, ornamental plants, fruit trees, potatoes, tomatoes, etc. which so far could not be treated without injury.

The following examples illustrate the invention, but they are not intended to limit it thereto.

EXAMPLE 1

Vine plants of the variety Müeller-Thurgau, grown in pots, susceptible to infestation with Peronospora, were sprayed four times in the order of decreasing concentrations with spray liquids containing a combination of 5 parts by weight of triphenyltin acetate, 60 parts by weight of manganese-ethylene-bis-dithiocarbamate or zinc-ethylene-bis-dithiocarbamate, and 35 parts by weight of carrier material, consisting of kaolin, cell pitch and a wetting agent. The quantities of active substance per litre of spray liquor, used in each case are listed in Table 1.

When the layer of liquid sprayed had dried, the plants were infected with a suspension of Peronospora sporangia. After an incubation period of one week, the infestation was developed in a humid chamber, the degree of infestation with Peronospora was determined and expressed in percents referred to untreated but infested control plants.

The ascertained results are given in Table 1. These data show that the combinations of triphenyltin-acetate with the carbamic acid derivatives, when applied at equal rates of active substance, have a highly increased effectiveness which is far superior to that of each of the individual component.

When zinc- or manganese-ethylene-bis-dithiocarbamate was applied alone to the plants, for example, at a rate of 4.8 mg., 100% of the plants treated were infested, i.e., the treated plants were infested to the same extent as the untreated control plants; the same quantity of this active substance however, combined with 0.4 mg. of triphenyltin acetate, completely prevented infestation of the plants, whereas the triphenyltin acetate, applied alone at a rate of 0.4 mg. per litre, permitted infestation of 27% of the plants. When using the combination of the present invention, such an infestation of the plants occurred only when the combination was applied at a concentration almost 20 times lower, i.e., at a rate of 0.025 mg. of triphenyltin acetate and 0.3 mg. of zinc- or manganese-ethylene-bis-dithiocarbamate.

EXAMPLE 2

Vine plants of the variety Müller-Thurgau, grown in pots, were treated four times in the manner described in Example 1, with spray liquids containing in different concentrations a combination of 5.0 parts by weight of triphenyltin acetate, 60 parts by weight of manganese- or zinc-ethylene-bis-dithiocarbamate, and 35 parts by weight of inert carrier materials, consisting of kaolin, cell pitch and wetting agent. Table 2 indicates the concentrations used.

In contrast to the test described in Example 1, the plants were infested with a suspension of Peronospora sporangia only 3 weeks after the treatment, and the disease was developed under optimum infestation conditions after a period of one week. The infestations that appeared with each concentration were counted and expressed in percents referred to untreated but infested control plants. The results of these tests are given in Table 2.

The said Table 2 shows that even under severer test conditions the combination of triphenyltin acetate with manganese- or zinc-ethylene-bis-dithiocarbamate is by far more effective than each of the individual components alone.

EXAMPLE 3

Vine plants of the variety Müller-Thurgau grown in pots were treated as described in Examples 1 and 2 with spray liquids containing in different concentrations a combination of 5 parts by weight of triphenyltin acetate, 60 parts by weight of zinc- or manganese-ethylene-bis-dithiocarbamate, and 35 parts by weight of inert carrier substances.

In this test, however, the vine plants were artificially sprinkled for 30 miunutes after the layer of the liquid sprayed had dried, so that, probably, a large part of the sprayed layer had been washed away. The plants were then infested with a suspension of *Peronospora sporangia;* after an incubation period of one week, the disease was caused to develop.

The ascertained results of the infestations are given in Table 3. The numerals indicate the degree of infestation with Peronospora in percents referred to untreated but infested control plants.

As conclusion from the said table, the combination of triphenyltin acetate and manganese- or zinc-ethylene-bis-dithiocarbamate is almost 10 times as effective as the individual components.

EXAMPLE 4

Sugar-beets, growing in a low-infested plot, were sprayed thrice in intervals of about a fortnight with a combination of active substances, i.e., triphenyltin chloride and manganese- or zinc-ethylene-bis-dithiocarbamate, at a rate of 80 g. of triphenyltin chloride and 1,120 g. of manganese- or zinc-ethylene-bis-dithiocarbamate per hectare. For comparison, the individual active components were sprayed at the usual commercial application rates and at the rates used with the combination.

The degree of infestation with Cercospora of the "untreated" plants was so low that it could not have influenced the harvest yields; this in pointed out by the data of the harvest yields in Table 4. This tablet also shows that the combination of active substances, i.e., of triphenyltin chloride and manganese- or zinc-ethylene-bis-dithiocarbamate, has an excellent stimulating effect, which is also confirmed by the very considerable, additional yields of the plots treated. These additional yields are much higher than those of the plots treated with the individual components at the usual commercial application rates. These noteworthy differences in harvest yields, too, are indicated in said Table 4.

EXAMPLE 5

Celery plants were sprayed six times in intervals of about a fortnight with a preparation containing bis-(triphenyltin)-oxide and manganese- or zinc-ethylene-bis-dithiocarbamate, at a rate of 140 g. of bis-(triphenyltin)-oxide and 1,120 g. of manganese- or zinc-ethylene-bis-dithiocarbamate per hectare. For comparison, the individual active components of the combination were sprayed alone (a) At the commercial rate of application,
(b) At a lower rate such as that at which the combination had been applied.

As this test was intentionally carried out in a low-infested plot, the plants were infested with celery rust only slightly. Hence, the infestation affected the harvest yield to a negligible degree only, which also results from the data on the harvest yields in Table 5.

Table 5 shows that only the plots treated with the combination of active substances, i.e., bis-(triphenyltin)-oxide and manganese- or zinc-ethylene-bis-dithiocarbamate, had outstanding additional yields which were much higher than those of the plots treated with each of the individual components at the commercial rate of application.

EXAMPLE 6

Potatoes of the variety "Bona" were sprayed four times, in intervals of a fortnight, with a combination of triphenyltin hydroxide and manganese-ethylene-bis-dithiocarbamate or zinc-ethylene-bis-dithiocarbamate at a rate of about 40 g. of triphenyltin hydroxide and 1,120 g. of zinc- or manganese-ethylene - bis - dithiocarbamate. For comparison, the individual components were also sprayed alone (a) At the commercial rate of application,
(b) At the application rates used with the combination.

The data on the harvest yields indicated in Table 6 clearly reveal the remarkable stimulating effect of the combination of triphenyltin hydroxide and manganese- or zinc-ethylene-bis-dithiocarbamate. On the plots sprayed with the combination the yield of tubers was essentially higher than on the plots sprayed with the individual components of the combination; as results from Table 6, the yields also exceeded the yields of the plots sprayed with each active substance alone at the commercial rate of application.

EXAMPLE 7

It is known that young vine plants are strongly injured by organo-tin compounds, for example, by triphenyltin acetate, already at very small application rates, for example, 100 g. of active substance per hectare or less, because these active substances burn the leaves and the tips of the sprouts.

The combination of triphenyltin acetate and manganese-ethylene-bis-dithiocarbamate does not injure young vine plants, even when, as shown in Table 7, it is applied at an overdose several times the normal.

In the present test, the vine was treated at increasing concentration with 100–300 g. of the active substance triphenyltin acetate in using a mixture consisting of 62.4 parts by weight of manganese-ethylene-bis-dithiocarbamate, 4.4 parts by weight of triphenyltin acetate and 20 parts by weight of cell pitch, 13 parts by weight of siliceous chalk and 0.2 part by weight of a wetting agent as inert carriers. This combination sprayed at an overdose, did not injure the vine plants.

When, however, the same quantity of the active substance triphenyltin acetate was sprayed alone, the vine was severely injured, even when the substance was applied at the lowest application rate of 100 g. of active substance per hectare.

Manganese-ethylene-bis-dithiocarbamate, too, injured vine plants at the two highest application rates. Particulars of this test are given in Table 7. The degree of injury was evaluated by means of a grading system using the numerals 0 to 5, 0 meaning no injury at all and 5 meaning total destruction of the plant.

EXAMPLE 8

Young potato plants, cultivated from potato eyes, in a green house, were treated when having reached a height of 10 cm. with various combinations of triphenyltin compounds and different quantities of manganese-ethylene-bis-dithiocarbamate.

The quantity of active triphenyltin compound used was always the same, i.e., 600 mg. per liter of spray liquor, whereas only the quantity of the manganese-ethylene-bis-dithiocarbamate added was varied, namely within a range of 300 and 25 or 0 mg. per liter of spray liquor.

The treatment was carried out 4 times. After drying of the layer of spray, the plants were exposed for 24 hours to a temperature of 25° C. in a humidity chamber having a relative moisture of 95–100%. The plants were then allowed to continue their growth in a green house at a temperature of 18–20° C.

One week after the treatment, the degree of injury to the plants was evaluated by visual inspection and with the aid of a grading system using the numerals 0 to 5, 0 meaning no injury at all and 5 meaning total destruction of the plant. In addition thereto the green weight of the plants was determined and expressed with reference to the weight of untreated plants=100.

The results are given in Table 8. They show that the admixture of small quantities of manganese-ethylene-bis-dithiocarbamate to the triphenyltin compounds reduces the phytotoxicity to zero.

EXAMPLE 9

Potatoes of the variety "Holland. Erstling" were treated 4 times in intervals of 10 days with a combination comprising 60 parts by weight of triphenyltin chloride and 20 parts by weight of manganese-ethylene-bis-dithiocarbamate; the rest of 20 parts by weight was inert material.

This preparation was applied by each treatment at a rate of 0.5 kg. per hectare, corresponding to 300 g. of triphenyltin chloride and 100 g. of manganese-ethylene-bis-dithiocarbamate.

For comparison, there was used an analogous preparation which contained 60% by weight of triphenyltin chloride only and 40% of inert carriers, but no manganese-ethylene-bis-dithiocarbamate, and still another preparation which contained 20% of manganese-ethylene-bis-dithiocarbamate only and 80% of inert carrier substances.

The above preparations were applied at a rate of 0.5 kg. per hectare, corresponding to 300 g. of triphenyltin chloride or 100 g. of manganese-ethylene-bis-dithiocarbamate. The infestation by *Phytophthora infestans* was evaluated in intervals of 10 days after each treatment by means of a grading system and the results were expressed in numerals from 0 to 5, 0 meaning no infestation at all and 5 meaning total infestation.

The harvest yields and the evaluation numerals of the infestation are given in Table 9. They show that the harvest yields of the plots treated with the combination of triphenyltin chloride and manganese-ethylene-bis-dithiocarbamate are considerably higher than those of the plots treated with triphenyltin chloride only, the fungicidal effects remaining equal in both cases. The plots treated with 100 g. of manganese-dithiocarbamate per hectare showed no effects of fungicidal action, and the yields were not higher than on untreated plots.

EXAMPLE 10

Tomato plants in the four-leaves stage were treated in a green house with combinations of various triphenyltin compounds and manganese-ethylene-bis-dithiocarbamate. The quantity of the triphenyltin compound was maintained at 300 mg. per liter of spray liquor, whereas the quantity of manganese-ethylene-bis-dithiocarbamate varied from 300 to 25 mg. per liter of spray liquor. For comparison, the triphenyltin compounds were also applied alone.

The degree of injury to the plants was evaluated by visual inspection after an action period of a fortnight and expressed in numerals from 0 to 5, 0 meaning no injury to the plants, 5 meaning total destruction of the plant. In addition thereto, the green weight of the plants was determined and expressed with reference to that of untreated plants=100.

The results are given in Table 10. They show that already very small quantities of manganese-ethylene-bis-dithiocarbamate admixed with the triphenyltin compounds at a ratio blend of 1 part of manganese-ethylene-bis-dithiocarbamate to 6 parts of triphenyltin compounds totally neutralize the phytotoxicity of the organotin compounds and at a ratio of 1 part by weight of manganese-ethylene-bis-dithiocarbamate to 12 parts by weight of triphenyltin compound, still markedly reduces the phytotoxicity.

TABLE 1

*Standard Test*

INFESTATION WITH PERONOSPORA AFTER DRYING OF THE LAYER SPRAYED

| Preparation | Degree of Peronospora infestation in percent, at mg. of active substance per litre of spray liquid | | | | | | | | | | | | |
|---|---|---|---|---|---|---|---|---|---|---|---|---|---|
| A, mg | 25 | 12.5 | 6.00 | 3.0 | 1.5 | 0.8 | 0.4 | 0.2 | 0.1 | 0.05 | 0.025 | 0.012 | 0.006 |
| B, mg | 300 | 150 | 5 | 38 | 19 | 9.5 | 4.8 | 2.4 | 1.2 | 0.6 | 0.3 | 0.15 | 0.075 |
| C, mg | 300 | 150 | 75 | 38 | 19 | 9.5 | 4.8 | 2.4 | 1.2 | 0.6 | 0.3 | 0.15 | 0.075 |
| A+B infestation, percent | 0 | 0 | 0 | 0 | 0 | 0 | 0 | 1.2 | 2.6 | 12 | 26 | 46 | 73 |
| A+C infestation, percent | 0 | 0 | 0 | 0 | 0 | 0 | 0 | 0.6 | 1.5 | 7.8 | 12.6 | 38 | 57 |
| A infestation, percent | 0 | 0.2 | 0.8 | 2.5 | 9.0 | 14 | 27 | 38 | 46 | 85 | 100 | 100 | 100 |
| B infestation, percent | 0 | 0 | 1.0 | 9.5 | 30 | 76 | 100 | 100 | 100 | 100 | 100 | 100 | 100 |
| C infestation, percent | 0 | 0.1 | 19 | 22 | 64 | 100 | 100 | 100 | 100 | 100 | 100 | 100 | 100 |
| Control infestation, percent | 100 | 100 | 100 | | | | | | | | | | |

A=Triphenyltin acetate.
B=Manganese-ethylene-bis-dithiocarbamate.
C=Zinc-ethylene-bis-dithiocarbamate.

TABLE 2

*Permanent Test*

INFESTATION WITH PERONOSPORA 3 WEEKS AFTER THE TREATMENT

| Preparation | Degree of Peronospora infestation in percent referred to "untreated", at mg. of active substance per litre of spray liquid | | | | | | | | | |
|---|---|---|---|---|---|---|---|---|---|---|
| A, mg | 25.0 | 12.5 | 6.0 | 3.0 | 1.5 | 0.75 | 0.38 | 0.19 | 0.1 | 0.05 |
| B, mg | 300 | 150 | 75 | 38 | 19 | 9.5 | 4.8 | 2.4 | 1.2 | 0.6 |
| C, mg | 300 | 150 | 75 | 38 | 19 | 9.5 | 4.8 | 2.4 | 1.2 | 0.6 |
| A+B infestation, percent | 0 | 0 | 0 | 3.9 | 5.7 | 43 | 78 | 95 | 100 | 100 |
| A+C infestation, percent | 0 | 0 | 0 | 1.8 | 5.5 | 31 | 40 | 85 | 98 | 100 |
| A infestation, percent | 1.6 | 7.7 | 12.0 | 54 | 98 | 100 | 100 | 100 | 100 | 100 |
| B infestation, percent | 16 | 67 | 94 | 100 | 100 | 100 | 100 | 100 | 100 | 100 |
| C infestation, percent | 2.2 | 17 | 37 | 55 | 90 | 100 | 100 | 100 | 100 | 100 |
| Control infestation, percent | 100 | 100 | | | | | | | | |

A=Triphenyltin acetate.
B=Manganese-ethylene-bis-dithiocarbamate.
C=Zinc-ethylene-bis-dithiocarbamate.

TABLE 3

*Sprinkling Test*

INFESTATION WITH PERONOSPORA AFTER SPRINKLING OF THE PLANTS TREATED

| Preparation | Degree of infestation with Peronospora in percent at mg. of active substance per litre of spray liquid | | | | | | | | | |
|---|---|---|---|---|---|---|---|---|---|---|
| A, mg | 25 | 12.5 | 6.0 | 3.0 | 1.5 | 0.75 | 0.38 | 0.19 | 0.1 | 0.05 |
| B, mg | 300 | 150 | 75 | 38 | 19 | 9.5 | 4.8 | 2.4 | 1.2 | 0.6 |
| C, mg | 300 | 150 | 75 | 38 | 19 | 9.5 | 4.8 | 2.4 | 1.2 | 0.6 |
| A+B infestation, percent | 0 | 0 | 0 | 1.4 | 23 | 36 | 54 | 90 | 100 | 100 |
| A+C infestation, percent | 0 | 0 | 0 | 0.8 | 11 | 28 | 46 | 76 | 95 | 100 |
| A infestation, percent | 2.7 | 14 | 38 | 64 | 98 | 100 | 100 | 100 | 100 | 100 |
| B infestation, percent | 9.5 | 49 | 89 | 100 | 100 | 100 | 100 | 100 | 100 | 100 |
| C infestation, percent | 3.6 | 18 | 54 | 68 | 95 | 100 | 100 | 100 | 100 | 100 |
| Control infestation, percent | 100 | 100 | 100 | | | | | | | |

A = Triphenyltin acetate.
B = Manganese-ethylene-bis-dithiocarbamate.
C = Zinc-ethylene-bis-dithiocarbamate.

TABLE 4

| Active Substance | Quantity of active substance per hectare | Harvest yield of beets, 100 kg./ha. | Additional yield of beets, 100 kg./ha. | Harvest yield of leaves, 100 kg./ha. | Additional yield of leaves, 100 kg./ha. | Infestation with cercospora evaluation numerals from 0–5* |
|---|---|---|---|---|---|---|
| B | 2,400 | 508 | +25 | 438 | +17 | 0.5 |
| B | 1,120 | 502 | +19 | 425 | +4 | 0.8 |
| C | 2,400 | 490 | +7 | 427 | +6 | 0.8 |
| C | 1,120 | 485 | +2 | 421 | ±0 | 1.0 |
| A | 360 | 680 | +197 | 596 | +175 | 0.1 |
| A | 80 | 488 | +5 | 492 | +1 | 0.5 |
| A+B | 1,120 / 80 | 695 | +212 | 614 | +183 | 0.1 |
| A+C | 1,120 / 80 | 674 | +191 | 608 | 177 | 0.1 |
| Untreated | 0 | 483 | ±0 | 421 | ±0 | 1.2 |

*0 = No infestation.
5 = Total infestation = plants destructed up to the heart-leaf.
A = Triphenyltin acetate.
B = Manganese-ethylene-bis-dithiocarbamate.
C = Zinc-ethylene-bis-dithiocarbamate.

TABLE 5

| Active Substance | Quantity of active substance, g./ha. | Harvest yield of tubers, 100 kg./ha. | Additional yield of tubers, 100 kg./ha. | Harvest yield of leaves, 100 kg./ha. | Additional yield of leaves, 100 kg./ha. | Infestation with septoria in evaluation numerals from 0–5* |
|---|---|---|---|---|---|---|
| B | 2,400 | 236 | +24 | 227 | +19 | 0.8 |
| B | 1,120 | 230 | +18 | 220 | +12 | 0.6 |
| C | 2,400 | 228 | +16 | 217 | +9 | 0.5 |
| C | 1,120 | 226 | +14 | 212 | +4 | 0.4 |
| D | 360 | 345 | +133 | 305 | +97 | 0 |
| D | 140 | 230 | +18 | 210 | +2 | 0.6 |
| B+D | 1,120 / 140 | 375 | +163 | 356 | +148 | 0.2 |
| C+D | 1,120 / 140 | 350 | +138 | 306 | +96 | 0.3 |
| Untreated | | 212 | ±0 | 208 | ±0 | 1.1 |

Grading system:
*0 = No infestation.
5 = Total infestation.
B = Manganese-ethylene-bis-dithiocarbamate.
C = Zinc-ethylene-bis-dithiocarbamate.
D = Bis-(triphenyltin)-oxide.

TABLE 6

| Active Substance | Quantity of active substance, g./ha. | Yield of bulbs, 100 kg./ha. | Additional yield, 100 kg./ha. |
|---|---|---|---|
| B | 1,440 | 258 | +30 |
| B | 1,120 | 230 | +2 |
| C | 1,440 | 240 | +12 |
| C | 1,120 | 231 | +3 |
| A | 360 | 270 | +42 |
| A | 40 | 228 | ±0 |
| A+B | 1,120 / 40 | 275 | +47 |
| A+B | 1,120 / 40 | 269 | +41 |
| Untreated | | 228 | ±0 |

A = Triphenyltin-acetate.
B = Manganese-ethylene-bis-dithiocarbamate.
C = Zinc-ethylene-bis-dithiocarbamate.

TABLE 7

*Degree of Injury to Vine Pants After Application of g./ha., Upon Visual Inspection a Fortnight After the Treatment*

| Preparation | | | | | |
|---|---|---|---|---|---|
| A, grams | 100 | 150 | 200 | 250 | 300 |
| A injury | 1–2 | 2–3 | 3 | 3–4 | 4 |
| B, grams | 1,400 | 2,100 | 2,800 | 4,200 | 5,600 |
| B injury | 0 | 0–1 | 2 | 2–3 | 4 |
| A+B, grams | 100 / 1,400 | 150 / 2,100 | 200 / 2,800 | 250 / 4,200 | 300 / 5,600 |
| A+B injury | 0 | 0 | 0 | 0 | 0 |

Grading system:
0 = No injury.
5 = Total destruction (dead).
A = Triphenyltin acetate.
B = Manganese-bis-dithiocarbamate.

TABLE 8
*Tests for the Phytotoxicity to Young Potato Plants of Combinations of Various Triphenyltin Compounds and Manganese-Ethylene-Bis-Dithiocarbamate*

| Type of triphenyltin compound | Mg. of tin compound per liter of spray liquor | \multicolumn{6}{c}{Degree of injury to potato plants upon addition of manganese-ethylene-bis-dithio-carbamate in mg./liter of spray liquor} | |
|---|---|---|---|---|---|---|---|---|
| | | 300 | 200 | 100 | 50 | 25 | 0 | |
| Triphenyltin acetate | 600 | 0 | 0 | 0 | 0-1 | 1 | 3 | Degree of injury.* |
|  |  | 110 | 115 | 108 | 105 | 95 | 74 | Green weight of the plants as compared to control plants=100. |
| Triphenyltin chloride | 600 | 0 | 0 | 0 | 1 | 2 | 4 | Degree of injury. |
|  |  | 118 | 105 | 102 | 100 | 80 | 61 | Green weight of the plants as compared to control plants=100. |
| Triphenyltin-hydroxide | 600 | 0 | 0 | 0 | 0 | 2 | 3-4 | Degree of injury. |
|  |  | 112 | 107 | 117 | 103 | 85 | 69 | Green weight of the plants as compared to control plants=100. |
| Triphenyltin-p-toluenesulfamide | 600 | 0 | 0 | 0 | 0 | 0 | 3 | Degree of injury. |
|  |  | 108 | 112 | 107 | 103 | 102 | 79 | Green weight of the plants as compared to control plants=100. |
| Triphenyl-dimethyl-acrylic acid | 600 | 0 | 0 | 0 | 0 | 0 | 2 | Degree of injury. |
|  |  | 116 | 123 | 109 | 103 | 108 | 98 | Green weight of the plants as compared to control plants=100. |
| Bis-triphenyltin oxide | 600 | 0 | 0 | 0 | 0 | 1 | 1-2 | Degree of injury. |
|  |  | 115 | 116 | 116 | 108 | 103 | 100 | Green weight of the plants as compared to control plants=100. |
| Untreated |  | 0 | 0 | 0 | 0 | 0 | 0 | Degree of injury. |
|  |  | 100 | 100 | 100 | 100 | 100 | 100 | Green weight. |

*Upon visual inspection in numerals from 0-5; 0=no injury, 5=destructed.

TABLE 9
*Evaluation of Infestation by Phytophthora Infestans and Harvest Yields of the Tests on Potatoes With Triphenyltin Chloride+Manganese-Ethylene-Bis-Dithiocarbamate*

| Compound | Quantity of active substance, g./ha. | Harvest yield, hw./ha. | Evaluation of infestation in numerals from 0-5 | | |
|---|---|---|---|---|---|
| | | | 1. Evaluation | 2. Evaluation | Final evaluation |
| Triphenyltin chloride+manganese-ethylene-bis-dithiocarbamate | 300 / 100 | 385 | 0 | 0, 5 | 1, 2 |
| Triphenyltin chloride | 300 | 293 | 0 | 0, 6 | 1, 3 |
| Manganese-ethylene-bis-dithiocarbamate | 100 | 205 | 1 | 2, 8 | 4, 8 |
| Untreated |  | 198 | 1 | 2, 7 | 5, 0 |

TABLE 10
*Tests for the Phytotoxicity to Tomato Plants With Combinations of Various Triphenyltin Compounds and Manganese-Ethylene-Bis-Dithiocarbamate*

| Type of triphenyltin compound | Mg. of active substance per liter of spray liquor | \multicolumn{6}{c}{Degree of injury to tomato plants after addition of manganese-ethylene-bis-dithio-carbamate in mg. per liter of spray liquor} | |
|---|---|---|---|---|---|---|---|---|
| | | 300 | 200 | 100 | 50 | 25 | 0 | |
| Triphenyltin acetate | 300 | 0 | 0 | 0 | 1 | 2 | 4 | Degree of injury.* |
|  |  | 112 | 109 | 110 | 103 | 90 | 62 | Green weight of the plants as compared to control plants=100. |
| Triphenyltin chloride | 300 | 0 | 0 | 0 | 1-2 | 2 | 4 | Degree of injury. |
|  |  | 109 | 112 | 108 | 98 | 88 | 65 | Green weight of the plants as compared to control plants=100. |
| Triphenyltin hydroxide | 300 | 0 | 0 | 0 | 1 | 2 | 4 | Degree of injury. |
|  |  | 113 | 108 | 104 | 102 | 93 | 68 | Green weight of the plants as compared to control plants=100. |
| Tris-(triphenyltin)citrate | 300 | 0 | 0 | 0 | 0 | 1 | 3 | Degree of injury. |
|  |  | 105 | 107 | 99 | 104 | 93 | 72 | Green weight of the plants as compared to control plants=100. |
| Bis-(triphenyltin)-oxide | 300 | 0 | 0 | 0 | 0 | 0 | 3 | Degree of injury. |
|  |  | 114 | 118 | 105 | 109 | 103 | 87 | Green weight of the plants as compared to control plants=100. |
| Untreated |  | 0 | 0 | 0 | 0 | 0 | 0 | Degree of injury. |
|  |  | 100 | 100 | 100 | 100 | 100 | 100 | Green weight of the plants as compared to control plants=100. |

*Upon visual inspection in numerals from 0 to 5; 0=no injury, 5=total destruction of the plant.

We claim:
1. A fungicidal agent comprising as the active ingredient a combination of from 12 to 1 parts by weight of a triphenyltin compound of the formula

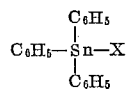

wherein X is a member selected from the group consisting of acetate, citrate, toluene sulfamide, acrylate, chloride, hydroxide, and oxide, and 1 to 30 parts by weight of a member selected from the group consisting of the zinc salt and the manganese salt of ethylene-bis-dithiocarbamic acid.

2. A fungicidal agent as in claim 1 wherein said triphenyltin compound is triphenyltin acetate.

3. A fungicidal agent as in claim 1 wherein said triphenyltin compound is triphenyltin hydroxide.

4. A fungicidal agent as in claim 1 wherein said triphenyltin compound is triphenyltin chloride.

5. A fungicidal agent as in claim 1 containing 1–30 parts by weight of ethylene-bis-dithiocarbamate salt per 1 part by weight of said triphenyltin compound.

6. A fungicidal agent as in claim 1 containing 2–12 parts by weight of said triphenyltin compound per 1 part by weight of the manganese salt of ethylene-bis-dithiocarbamic acid.

7. A method for the control of phytopathogenic microorganisms which comprises treating plants with a fungicidal agent comprising as the active ingredient a combination of from 12 to 1 parts by weight of a triphenyltin compound of the formula

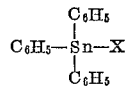

wherein X is a member selected from the group consisting of acetate, citrate, toluene sulfamide, acrylate, chloride, hydroxide, and oxide, and 1 to 30 parts by weight of a member selected from the group consisting of the zinc salt and the manganese salt of ethylene-bis-dithiocarbamic acid.

References Cited in the file of this patent

UNITED STATES PATENTS

| | | |
|---|---|---|
| 2,614,959 | Somerville | Oct. 21, 1952 |
| 2,776,922 | Somerville | Jan. 8, 1956 |

FOREIGN PATENTS

| | | |
|---|---|---|
| 797,073 | Great Britain | July 1, 1954 |
| 840,211 | Great Britain | Aug. 15, 1958 |
| 1,102,418 | France | May 4, 1955 |
| 1,188,939 | France | Dec. 23, 1957 |
| 1,025,198 | Germany | Feb. 27, 1958 |
| 562,605 | Italy | Mar. 16, 1957 |

OTHER REFERENCES

Chemical Abstracts, vol. 52, entry 11336c, 1958 (citing Colin, Phytoma, No. 94, 25–8, 1958).

Chemical Abstracts, vol. 52, entry 13171i, 1958 (citing Bonde et al., Plant Disease Reptr., 42, 330–3, 1958).

Chemical Abstracts, vol. 52, 20837h, 1958 (citing Callbeck, Am. Potato J., 35, 626–34, 1958).

Chemical Abstracts, vol. 52, entry 20841i, 1958 (citing Corte et al., Notiz., malattie piante, 43–44, 9–46, 1958).